Aug. 12, 1969
W. F. KITA, JR
3,461,266
FLEXIBLE SHAFT CUTTING METHOD EMPLOYING
WORK-IN-CIRCUIT ELECTRICAL FUSION
Filed June 22, 1966
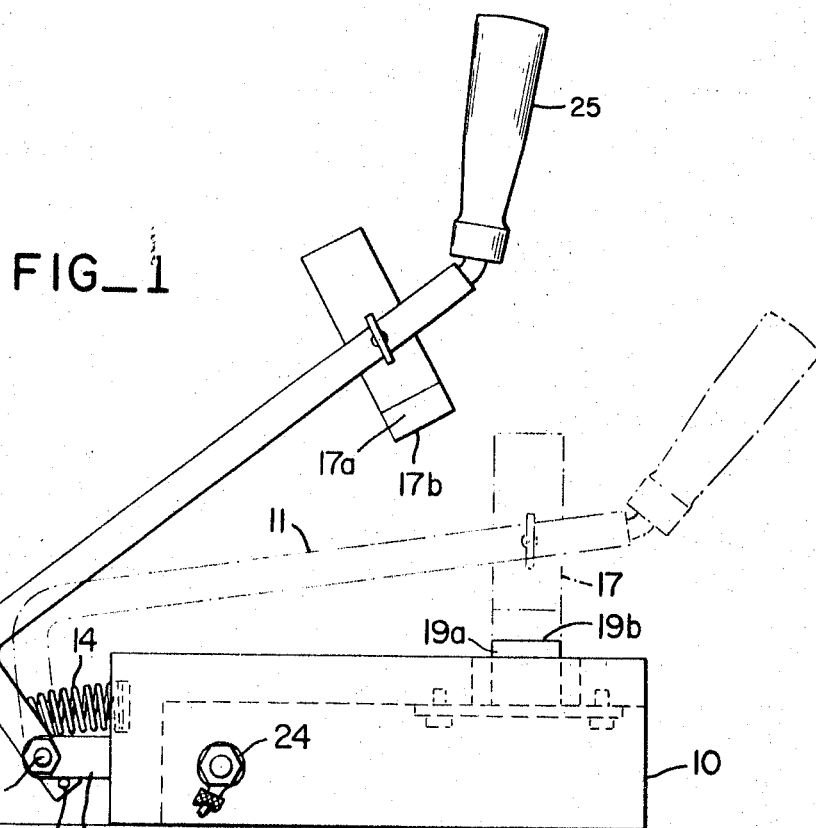
FIG_1
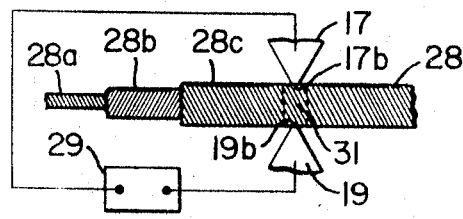
FIG_3
FIG_4
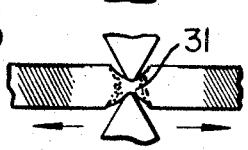
FIG_5
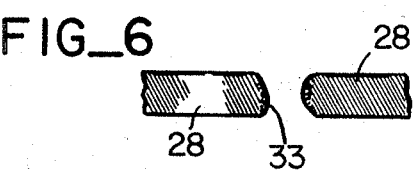
FIG_6
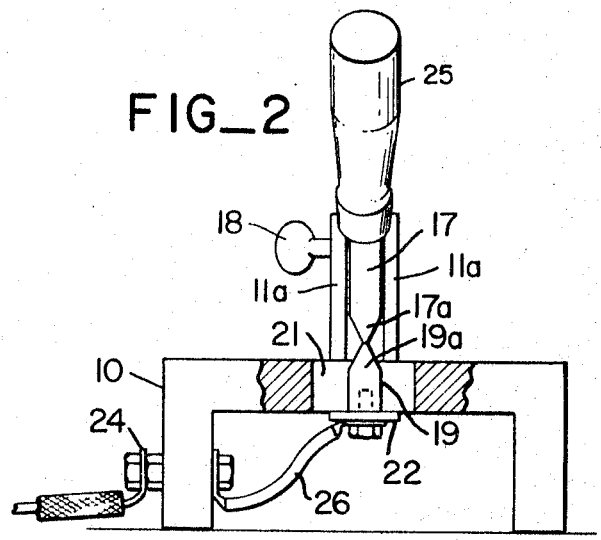
FIG_2
INVENTOR.
WALTER F. KITA JR.
BY
*Fleher and Swain*
ATTORNEYS

United States Patent Office 3,461,266
Patented Aug. 12, 1969

3,461,266
**FLEXIBLE SHAFT CUTTING METHOD EMPLOY-
ING WORK-IN-CIRCUIT ELECTRICAL FUSION**
Walter F. Kita, Jr., 1105 Carmelita Ave.,
Burlingame, Calif. 94010
Filed June 22, 1966, Ser. No. 559,609
Int. Cl. B23p 1/00
U.S. Cl. 219—68          1 Claim

ABSTRACT OF THE DISCLOSURE

A method for severing flexible shaft cores of the type having at least two layers of helicoidally wound wire strands. The core is inserted between two electrical conductor members having substantially parallel and relatively sharp cutting edges, these members being connected to a source of current. The edges are pressed against the sides of the outer core layer in diametrically opposite regions whereby current passes through the strands of wire to cause rapid heating and fusion of the wires in the region between the edges of the conductor members whereby the edges penetrate the fused region. Pull is applied along the length of the core to aid severance as the conductor members penetrate the fused region.

---

This invention relates generally to flexible drive shafts such as are employed for automotive speedometers and various other industrial purposes, and particularly to a method and apparatus for severing the cores of such shafts.

One type of flexible drive shaft assembly which is widely used in the automotive industry consists of a rotatable flexible core disposed within an outer flexible sheath or casing. The casing may be in the form of a flexible tube made of metal, with or without a plastic covering. The ends of the core are attached to tips which in turn make connection with driving and driven parts. The core is formed of spring wire tightly wrapped helicoidally in several superposed layers. Several strands of spring wire are used for each layer so that a complete core may comprise as many as forty-seven or more strands of wire.

The cutting of such cores presents a serious problem. One method which is recommended by some manufacturers consists of first marking the core where the cut is to be made and then making the cut by use of an acetylene cutting torch. This cutting method requires considerable skill to attain proper accuracy. Heating by the torch tends to be excessive, with the result that the strength of the strands near the cut end is impaired. Also it is difficult to provide a neat cut which will permit application of a tip without excessive filing or grinding.

Another cutting method which has been recommended by manufacturers consists of first marking the core where it is to be cut and then employing a swaging and cutting tool. This tool serves to swage the core over a length of the order of one inch (one-half inch on each side of the mark), after which the swaged portion is cut between an anvil and a chisel-like cutting member which is struck by a hammer. This provides a somewhat flattened and rough cut end which must be ground or filed before fitting it into a tip. It will be evident that this latter method is time consuming and likewise requires considerable skill to provide satisfactory cut ends. It is not uncommon to provide a cut end which is so unsatisfactory as to require recutting, with resulting wastage.

In general, it is an object of the present invention to provide a simple method and apparatus for the severing or cutting of flexible drive cores which can be used either in the shop or field, and which will overcome the difficulties of prior methods and apparatus.

Another object of the invention is to provide a method and apparatus of the above character which can be used by relatively unskilled persons to quickly obtain a satisfactory cut.

Additional objects and features of the invention will appear from the following description in which the preferred embodiments have been described in detail in conjunction with the accompanying drawing.

Referring to the drawing:

FIGURE 1 is a side elevational view showing my apparatus;

FIGURE 2 is a front view, partly in section, showing the apparatus of FIGURE 1, with the operating lever in a lowered position;

FIGURE 3 is a detail illustrating a flexible drive core made up of wound strands of wire, and illustrating how my method is initially applied to start a cut;

FIGURE 4 is a view similar to FIGURE 3 but indicating some penetration of the conducting members into the fused portions of the core as the method proceeds;

FIGURE 5 illustrates a stage of the method immediately following FIGURE 4, at which time the cable is about to be severed;

FIGURE 6 is a view showing the severed ends produced by my method.

My method can best be described after a description of the apparatus shown in FIGURES 1 and 2. This apparatus consists of a base 10 made of suitable material such as a molded insulating composition. An operating lever 11 made of suitable metal, has a hinge connection 12 to the bracket 13 which in turn is mounted on the rear end of the base 10. A compression spring 14 serves to urge the lever 11 to the raised position shown in solid lines in FIGURE 1. Upward movement of the lever may be limited by the stop pin 16. A conductor member 17 is mounted upon lever 11 and preferably is a bar made of electrically conductive material such as compressed carbon or graphite. As illustrated in FIGURES 1 and 2, the lever 11 may be made to include two spaced members 11a between which the conductor member 17 is disposed. Suitable means such as a set screw 18 serves to clamp the conductor member in proper position and also ensures good conductivity between the lever and the conductor member.

Another conductor member 19 is mounted upon the base. It can be made of suitable conductive material such as hard copper or bronze. It is shown located within an opening 21 in the base, and is secured to a metal strip 22 which in turn is attached at its ends to the base.

Terminals 23 and 24 are provided for making electrical connection to a source of current. Terminal 23 is mounted on the lever 11, while terminal 24 may be mounted on one side of the base as shown in FIGURE 2. A conductor 26 makes electrical connection between terminal 24 and the strip 22 and conductor member 19.

The conductor members 17 and 19 have opposed end portions 17a and 19a which are tapered or chisel-shaped. This serves to provide relatively straight blunt edges 17b and 19b which are in alignment and in opposition when the lever 11 is lowered to the position shown in FIGURE 2, by manually grasping the handle 25.

My method of cutting flexible shaft core material by use of the apparatus shown in FIGURES 1 and 2 is illustrated in FIGURES 3–6. The flexible shaft core 28 is made up of a plurality of layers formed by helicoidally wound strands of wire. These layers are indicated at 28a, 28b, and 28c. The successive layers are wound tightly upon each other. In a typical instance the core may have a diameter of the order of ⅛ inch. When it is desired to cut such a core, the core is first marked, and then while the lever 11 is in a raised position, the cable is positioned upon the base 10 with the mark coincident with the upper edge 19b of the conductor member 19. Assuming that the terminals 23 and 24 are connected to a storage battery 29, such as one capable of delivering about 12 volts, the circuit connections to the members 17 and 19 are as shown in FIGURE 3. The next step is for the operator to grasp the handle 25 and swing the lever 11 downwardly until the blunt edge 17b of the conductor member 17 is brought into contact with the upper side of the core 28. A fair amount of manual pressure is applied to ensure relatively good electrical contact. By virtue of the contact established between members 17 and 19 and the core 28, the circuit from the battery 29 is closed and sufficient electrical energy flows through the core to cause rapid heating in the region 31 between the edges 17b and 19b. Almost immediately the wire strands in this region become red hot. The heat rapidly penetrates through all of the wire layers, and within a matter of seconds fusion and coalescence of the strands occurs within this zone. FIGURE 4 represents the commencement of fusion within the zone 31, and as this condition is attained, continued downward pressure upon the lever 11 results in penetration of the edges 17b and 19b into the fused zone, such penetration continuing rapidly as indicated in FIGURE 5. About the time the edges 17b and 19b come into close proximity fusion has occurred to such a degree that a small amount of manual pull applied to one part of the core causes the two parts of the core to separate. Simultaneously with severance of the core, the operator permits the lever 11 to return to its raised position. Immediately upon severance, the fused metal solidifies over the severed ends as shown in FIGURE 6. Thus the end of each cable part now has a fused mass of metal 33 which is bonded to the ends of all of the wire strands. A severed end formed in this fashion can readily be attached to a tip. Generally no grinding or filing is required, and the strands of wire adjacent the weld metal 33 have not been weakened by heat treatment.

It will be evident from the foregoing that I have provided a method and apparatus which can be used effectively under either shop or field conditions, for severing flexible shaft cores. No great skill is required to carry out the method, and uniformly good results are obtained in successive operations. The method completely eliminates the problem of frayed ends, and avoids reshaping or swaging either before or after severing.

I claim:

1. In a method for the severing of flexible shaft cores of the type comprising at least two layers of helicoidally wound wire strands, the steps of inserting the core between two electrical conductor members having substantially parallel and relatively sharp cutting edges that are electrically connected to a source of electrical current, causing said edges of said members to be pressed against the sides of the outer layer of the core in diametrically opposite regions whereby current passes through the strands of wire to effect rapid heating and fustion of all of the wires in a region between the conductor members, causing the conductor members to penetrate said fused region and applying pull along the length of the core to aid severance as the conductor members penetrate the fused region.

References Cited
UNITED STATES PATENTS

| | | | |
|---|---|---|---|
| 1,586,645 | 6/1926 | Bierman | 219—68 X |
| 2,298,528 | 10/1942 | DeCausse | 219—68 |
| 2,621,277 | 12/1952 | Brewer | 219—68 |
| 2,706,231 | 4/1955 | Tyler et al. | 219—68 |
| 3,354,478 | 11/1967 | Allen | 219—234 X |

JOSEPH V. TRUHE, Primary Examiner

R. F. STAUBLY, Assistant Examiner

U.S. Cl. X.R.

219—234